United States Patent [19]

Law et al.

[11] 4,113,665
[45] Sep. 12, 1978

[54] COATINGS PREPARED FROM TRIALKOXYSILANES

[75] Inventors: Gabriel H. Law, Rancho Palos Verdes; Albert Peter Gysegem, Monrovia, both of Calif.

[73] Assignee: Ameron, Inc., Monterey Park, Calif.

[21] Appl. No.: 765,223

[22] Filed: Feb. 3, 1977

[51] Int. Cl.$^2$ .......................................... C08G 77/00
[52] U.S. Cl. .............................. 260/37 SB; 528/29; 528/34
[58] Field of Search .............. 260/37 SB, 46.5 R, 2 S, 260/46.5 G; 106/287

[56] References Cited

U.S. PATENT DOCUMENTS

| | | | |
|---|---|---|---|
| 2,027,932 | 1/1936 | Ray | 260/2 S X |
| 2,630,446 | 3/1953 | Gresham | 260/2 S X |
| 2,698,314 | 12/1954 | Rust | 260/46.5 R |
| 2,718,507 | 9/1955 | Rauner | 260/46.5 R X |
| 3,457,221 | 7/1969 | Stengle | 260/46.5 R |
| 3,705,120 | 12/1972 | Kawaguchi | 260/46.5 G X |
| 3,776,881 | 12/1973 | Lerner et al. | 260/46.5 G |
| 3,917,648 | 11/1975 | McLeod | 260/32.8 SB |

Primary Examiner—Lewis T. Jacobs
Attorney, Agent, or Firm—Christie, Parker & Hale

[57] ABSTRACT

Chemically resistant coatings comprise a binder, the major portion of which is prepared by reacting, in the presence of an acidic solution, trialkoxysilanes with aliphatic polyols and/or silicone intermediates. The silanes have the formula

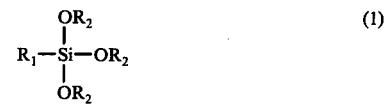

where $R_1$ is selected from the group consisting of alkyl, aryl and cycloalkyl groups containing up to about 6 carbon atoms and each $R_2$ is independently selected from the group consisting of alkyl, hydroxyalkyl, alkoxyalkyl and hydroxyalkoxyalkyl groups containing up to about 6 carbon atoms. The aliphatic polyols contain an average of at least two carbon bonded hydroxyl groups per polyol. The silicone intermediates have the formula

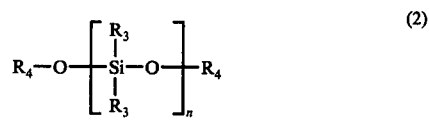

where each $R_3$ is selected from the group consisting of the hydroxy group and alkyl, aryl, and alkoxy groups having up to about 6 carbon atoms. Each $R_4$ is selected from the group consisting of hydrogen and alkyl and aryl groups having up to about 6 carbon atoms. "$n$" is selected so that the average molecular weight of the silicone intermediates is from about 500 to about 2000.

In the binder, the weight ratio of silanes to polyols is greater than about 5:1 and the weight ratio of silane to silicones is greater than about 1:1. The weight ratio of silanes to polyols and silicones in combination is less than about 20:1.

49 Claims, No Drawings

COATINGS PREPARED FROM TRIALKOXYSILANES

BACKGROUND

There is a need for a protective coating composition which is curable at ambient temperature and provides corrosion, chemical, solvent, weathering, and heat resistance. Exemplary of surfaces requiring coating compositions with the above features are steel structures in chemical processing plants, oil refineries, coal fired power plants, and offshore drilling platforms; and internal surfaces of tanks of a petroleum tanker carrying crude oil or refined oil products such as fuel oil, lube oil, kerosene, gasoline, jet fuel and the like.

Thermoplastic coatings such as polyvinyl chloride polyvinyl acetate copolymers, thermosetting coatings based on epoxies and urethanes, and inorganic zinc coatings are used for such surfaces. However the thermoplastic coatings have inadequate heat and solvent resistance for application to surfaces such as power plant stacks and petroleum tanker tanks. Many thermosetting coatings have poor resistance to weathering due to degradation from ultraviolet light. In addition, thermosetting polymers have poor curing properties when applied at low temperatures.

Inorganic zinc coatings have been used successfully for providing corrosion resistance in moist and salty atmospheres. Exemplary of such coating compositions is that described by McLeod in U.S. Pat. No. 3,917,648. McLeod describes coating compositions containing finely divided metallic zinc held in a binder consisting essentially of the reaction product of orthosilicates and aliphatic polyols. McLeod notes that minor amounts of alkyl trialkoxyalkyl silanes can be used for preparing the binder.

Although inorganic coatings containing zinc such as that of McLeod provide corrosion, solvent and heat resistance, they lack resistance to a broad spectrum of chemicals, and in particular they are not satisfactory for petroleum tanker tanks. One problem found when inorganic coatings containing zinc are used in petroleum tanker tanks is that inorganic zinc in the coating can contaminate jet fuel with resultant sludge formation at high temperatures. A second problem is that inorganic zinc lacks resistance to crude or virgin naphtha which can contain a small amount of corrosive acid. And a third problem is that coatings such as that of McLeod which contain inorganic zinc in a silicate backbone structure lack resistance to attack by sulfur dioxide and carbon dioxide. Resistance to attack by sulfur dioxide and carbon dioxide is important because it is current practice to cycle petroleum tanker stack gas to tanks containing petroleum products to prevent explosion. Since the stack gas contains carbon dioxide and sulfur dioxide, both of which are corrosive to zinc coatings, the under deck area of oil tanker tanks when exposed to stack gas can fail within 12 months as compared to a normal life of 10 years or longer.

Also, inorganic zinc coatings have poor aesthetics and usually require a topcoat when used in a visible location.

Pure silicone resins and silicone resins polymerized with organic resins have been considered for use in such applications. However, although they can provide some chemical and solvent resistance, they are not suitable for coating interior surfaces of tanker tanks because heat cure of these resins is generally required, and this is too slow and too expensive to be used commercially in this type of application.

Therefore, there is a need for a coating for protecting surfaces from corrosion and attack by chemicals, solvents, weathering, and heat where the coating can be applied economically at ambient temperatures.

SUMMARY OF THE INVENTION

This invention provides such a coating. The major portion of the binder of this coating is prepared by reacting, in the presence of an acidic solution, trialkoxysilanes with aliphatic polyols, silicones, or both.

The trialkoxysilanes have the formula

where $R_1$ is selected from a group consisting of alkyl aryl, and cycloalkyl groups containing up to about 6 carbon atoms and where each $R_2$ is independently selected from the group consisting of alkyl, hydroxyalkyl, alkoxyalkyl and hydroxyalkoxylalkyl groups containing up to about 6 carbon atoms.

The aliphatic polyols reacted with the trialkoxysilanes contain an average of at least two carbon bonded hydroxy groups per polyol and have an average molecular weight of at least 62.

The silicone intermediates reacted with the trialkoxysilanes have the formula

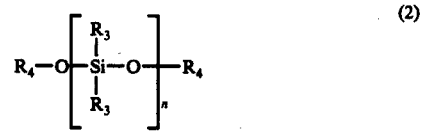

where each $R_3$ is independently selected from the group consisting of the hydroxy group and alkyl, aryl, and alkoxy groups having up to about 6 carbon atoms, and each $R_4$ is independently selected from the group consisting of hydrogen and alkyl and aryl groups having up to about 6 carbon atoms. "$n$" is selected so that the average molecular weight of the silicone molecules is from about 500 to about 2000.

The weight ratio of the silanes to polyols reacted to prepare the binder is from about 5:1 to about 20:1. The weight ratio of silanes to silicones reacted to prepare the binder is from about 1:1 to about 9:1. When both polyols and silicones are reacted with the trialkoxysilanes, the weight ratio of silanes to polyols and silicones in combination is maintained less than about 20:1.

Coatings containing these binders exhibit good resistance to corrosion, weathering, heat, chemical attack, and solvent attack, including resistance to sulfur dioxide and salt water. The coatings are curable at ambient temperatures, including sub-freezing temperatures. Preferably a coating containing these binders comprises from about 5 to 85% by weight binder. To add corrosion resistance to the coating composition, zinc oxide, or when the coating is not going to be used in a service such as jet fuel service requiring resistance to acid attack, metallic zinc can be included in the coating. For improved resistance to sulfur dioxide, barium fillers such as barium metaborate and barytes can be added to the coating.

Coatings containing the binders of this invention can be applied directly to a surface to be treated. They also can be applied as a topcoat over a primer such as an anticorrosion coating containing inorganic zinc.

To treat a surface with coatings of this invention, a partially hydrolyzed silane can be reacted with a polyol and/or silicone directly on the surface in the presence of atmospheric moisture. Preferably the silane is from about 70 to about 90% hydrolyzed before it is applied to the surface to be protected for quick curing. Curing can be effected at ambient temperature.

These and other features, aspects and advantages of the present invention will become more apparent from the following description and appended claims.

DESCRIPTION

Binders for preparing coatings resistant to attack by solvents, chemicals, heat and weathering have as the major portion of the binders, a binder prepared by reacting, in the presence of an acidic solution:

(a) trialkoxysilanes having the formula

 (1)

where $R_1$ is selected from the group consisting of aryl, alkyl, and cycloalkyl groups containing up to about 6 carbon atoms and where each $R_2$ is independently selected from the group consisting of alkyl, hydroxyalkyl, alkoxyalkyl and hydroxyalkoxyalkyl groups containing up to about 6 carbon atoms, with:

(b) (i) aliphatic polyols containing an average of at least two carbon bonded hydroxy groups per polyol and having an average molecular weight of at least 62 and/or (ii) silicone intermediates of the formula

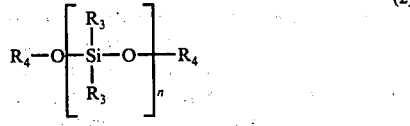 (2)

where each $R_3$ is independently selected from the group consisting of the hydroxy group and alkyl, aryl and alkoxy groups having up to about 6 carbon atoms, where each $R_4$ is independently selected from the group consisting of hydrogen and alkyl and aryl groups having up to about 6 carbon atoms, and where $n$ is selected so that the average molecular weight of the silicone intermediates is from 500 to 2000.

Coatings containing these binders can be used for treating materials to protect them from weathering, solvents, including hydrocarbon solvents and salt water, chemicals such as sulfur dioxide and heat. Illustrative of materials which can be treated are concrete; vitreous surfaces; and metallic surfaces such as the interior surfaces of petroleum tanker tanks used for carrying refined and unrefined petroleum, the interior surfaces of petroleum tanker tanks used for carrying refined and unrefined petroleum, the interior surfaces of boiler stacks such as coal fired power plant stacks, and surfaces of off-shore drilling platforms. Coatings containing these binders also can be used to protect other coatings such as inorganic coatings containing metallic zinc used to protect metallic surfaces from corrosion. When so used the coating containing the inorganic zinc provides corrosion resistance while the over or top coat containing a binder of this invention protects the inorganic zinc coating from chemical attack.

With reference to the trialkoxysilanes, $R_1$ contains less than about 6 carbon atoms so that a trialkoxysilane can be hydrolyzed easily. Generally, the lower the molecular weight of $R_1$, the less steric hindrance present to interfere with hydrolysis of the silane. For quick hydrolysis to obtain a fast drying coating, preferably $R_1$ is the methyl or ethyl group. To provide a coating with superior heat resistance, $R_1$ can be the phenyl group. Exemplary of the groups which $R_1$ can be are the methyl, ethyl, n-propyl, isopropyl, n-butyl, isobutyl cyclohexyl, and phenyl groups.

Each $R_2$ can be the same or different. $R_2$ is limited to alkyl, hydroxyalkyl, alkoxyalkyl and hydroxyalkoxyalkyl groups containing less than about 6 carbon atoms so that the alcohol analogue of $R_2$ formed during hydrolysis of the silane has sufficient volatility to evaporate so the binder can cure. Generally, the higher the molecular weight of $R_2$, the lower the volatility of its alcohol analogue. The $R_2$ groups are not sterically-hindered to the extent that hydrolysis does not take place. Exemplary of the groups which $R_2$ can be are the methyl, ethyl, n-propyl, isopropyl, n-butyl, isobutyl, hydroxymethyl, hydroxypropyl, methyloxymethyl, methyloxyethyl, hydroxyethyloxyethyl groups, and the like. Preferably $R_2$ is the methyl or ethyl group when quick curing of a coating is desired. However, under certain conditions such as coating interior surfaces under high temperature operating conditions when low volatility is required, $R_2$ can be a higher molecular weight group such as the methyloxyethyl or ethyloxyethyl group.

The binders of this invention are essentially reaction products of the above-described trialkoxysilanes with polyols and/or hydroxy functional silicones. With reference to the polyol reactant, it may be partially esterified or otherwise modified providing it has at least 2 free hydroxy groups per average molecule to participate in the reaction. Other hydroxy-bearing materials may be present and may or may not react with the silane. Thus the polyol-silane reaction mixture may contain a monohydroxy reactant such as an alkanol, ether alkanol or the like, and such monohydroxy material may be mixed with the polyol silane during or after the latter is formed. Although the polyol or monohydroxy material may have a molecular weight of up to about 200 to 400 or more, especially if they are polyoxyalkylene polyols, such as the polyoxyalkylene glycols, e.g. polyethylene glycols, or alkyl-capped polyoxyalkylene polyols, the polyols and monohydroxy materials often have molecular weights up to about 100. The lowest molecular weight possible for the polyol is 62, the molecular weight of ethylene glycol. Higher molecular weight polyols are usually a minor molar amount of the total polyol employed with the lower molecular weight polyol being the major amount.

The preferred polyols are ethylene glycol, propylene glycol and glycerol, and ethylene glycol is the most highly preferred polyol reactant from both the product quality and cost standpoints. Other polyols which may be employed in making the binders of the invention include diethylene glycol, trimethylene glycol, triethylene glycol, dipropylene glycol, tripropylene glycol, polyethylene glycols, trimethylol propane, 1,6- or 2,6-hexanediol, neopently glycol, 1,3-butylene glycol, pentaerythritol, hexylene glycol, partially-esterified polyols, cyclopentanediol and the like. Mixtures of these polyols may also be reacted, especially those which contain a major portion of ethylene glycol, propylene glycol or glycerol.

The choice of polyol may affect the gelling characteristics of the product. For instance, if higher molecular weight polyols are used, proper adjustment to lower ratios of polyol with respect to the silane reactant on the basis of the number of hydroxy groups per $R_2$ group in the silane is advisable, and the extent of alcohol removal from the reaction mixture may be increased to obtain a hard adhesive coating. The gelling characteristics of the reaction mixture and properties of the coating compositions may be affected, depending upon the choice of the silane reactant and the extent of

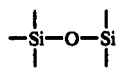

and silicon-carbon bonds that may be present. The use of high ratios to silanes of less volatile higher molecular weight glycols or other polyols having other groupings thereon, may lead to products which are slow-curing and give soft coatings due to their low volatility. This may indicate the use of only minor molar amounts of these polyols based on the total polyol reacted.

With reference to the silicone intermediates, generally the lower the molecular weight of $R_3$, the more quickly the binder formed from a trialkoxysilane and silicone cures because of reduced steric hindrance. Therefore preferably each $R_3$ and each $R_4$ are selected from the group consisting of the methyl and ethyl groups, and for the $R_3$ groups providing functionality for condensation with hydrolyzed silanes, from the hydroxy group and low molecular weight alkoxy groups. Exemplary of groups which $R_3$ can be are, in addition to the methyl and ethyl groups, n-propyl, isopropyl, n-butyl, isobutyl, methoxy, ethoxy, phenyl and the like. When high heat resistance is desired some of the $R_3$ groups can be the phenyl group. However, presence of the phenyl group adversely affects the ultraviolet resistance of a binder. Exemplary of groups which $R_4$ can be are, in addition to the methyl and ethyl groups, n-propyl isopropyl, n-butyl, isobutyl, phenyl and the like.

In the above formula for the silicone intermediates $n$ is selected so that the average molecular weight of the silicone molecules is from about 500 to about 2000. At molecular weights of less than about 500, the resulting binder is too brittle to form a satisfactory coating. At molecular weights greater than about 2000, the silicone exhibits the characteristics of a silicone oil in that it lacks sufficient reactivity to react quickly with the trialkoxysilanes to form a binder.

The chemical and physical characteristics of the binders of this invention depend upon the molecular weight, functionality, and weight ratios of the reactants. As the degree of functionality, i.e., the number of hydroxy and alkoxy groups, of the polyols and silicones increases the brittleness of the resultant binder increases, believed due to the presence of more crosslinking in the binder. Although this is desirable for improved resistance to chemical and solvent attack, the resultant binder exhibits less adhesion to a surface to be coated. On the other hand, as the degree of functionality of the polyol and silicone decreases, less crosslinking results and less resistance to chemical and solvent attack is exhibited by the binder.

Similarly, the weight ratio of the silane to the polyol and silicone affects the characteristics of the binder. Generally, as the weight ratio of silane to polyol and silicone increases, the resulting binder becomes stiffer and less flexible. Preferably the weight ratio of silane to polyol is less than about 20:1 and the weight ratio of silane to silicone is less than about 9:1 so that a binder having sufficient flexibility to form a continuous coating can be produced. Preferably the weight ratio of silanes to polyols is greater than about 5:1 and silanes to silicones is greater than about 1:1, so that the coating formed has adequate solvent and chemical resistance to protect the underlying surface. At weight ratios less than 5:1 and 1:1 for the silane to polyol and silane to silicone, respectively, the binder is soft and exhibits low resistance to solvent and chemical attack.

The above weight ratios are based on the trialkoxysilane being reacted with either the polyol or the silicone. If a binder is formed where the silanes are reacted with both polyols and silicones, the weight ratios of silanes to polyols reacted is greater than about 5:1, the weight ratio of silanes to silicones reacted is greater than about 1:1, and the weight ratios of silanes to polyols and silicones in combination is less than about 20:1 to provide an adherent coating exhibiting high resistance to solvents, weathering, heat and chemicals. In order to prepare a binder having optimum chemical and physical properties, the weight ratios, molecular weight and degree of functionality of the reactants are all varied within the ranges described above. For example, if the degree of functionality of the polyols is increased, then to provide a binder with substantially the same physical and chemical characteristics, it is necessary to decrease the weight ratio of silane to polyol and/or use a higher molecular weight polyol.

Other reactants in addition to the trialkoxysilanes, polyols and silicones discussed above can be used to prepare the binders of this invention. For example, minor amounts of dialkoxysilanes such as dimethyl dimethoxysilane can be used. However only minor amounts of dialkoxysilanes are used to form the binders because they lead to formation of binders containing less crosslinking and therefore less resistance to solvent and chemical attack.

The trialkoxysilanes are reacted with the polyols and/or silicones in the presence of an acidic aqueous solution. The reaction proceeds by hydrolysis of the silane with release of $R_2$—OH groups followed by polycondensation of the hydrolyzed silane with the other reactants present. The hydrolysis of trialkoxysilanes at a neutral pH is generally too slow to be able to use the silane in commercial coating formulations. However, in acidic medium, the rate of hydrolysis is appreciably increased. In acid conditions, achieved by adding acid to the water used in the hydrolysis, the equilibrium conditions are reached in hours. These equilibrium conditions, which are,

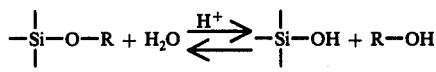

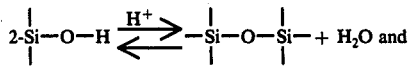

-continued

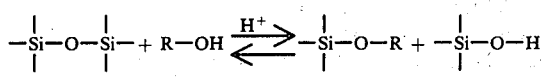

all occur simultaneously. Also under acid conditions, the tendency for linear chain extension is much stronger than for cross-linking. All of these account for the liquid nature of the partially hydrolyzed silane when in a closed system where no alcohol can escape and no additional water is added. In the atmosphere, the alcohol can evaporate, thereby driving the equilibrium toward condensation of the hydrolyzed silane with the other reactants. Additional water from atmospheric moisture or from immersion in either fresh or sea water after partial curing completes the hydrolysis. The end product is a thoroughly cross-linked structure of Si—O—Si and Si—C bonds.

Dilute aqueous hydrochloric and phosphorous acids can be used to catalyze the hydrolysis and condensation of the precursor. Other acids which can be used as catalysts include mineral acids such as sulfuric acid, phosphoric acid, and nitric acid, and organic acids such as trichloracetic acid, formic acid and oxalic acid. When coating steel surfaces, or overcoating anticorrosion coatings containing metallic zinc, phosphoric acid is a preferred catalyst because it does not deleteriously react with steel or zinc. The amounts to be used vary for each acid, but the optimum quantity can readily be determined by a chemist of ordinary skill in the art. The action of organic acids generally is slower than that of inorganic acids. Therefore, a binder catalyzed with an organic acid preferaby is immersed in or sprayed with water after the binder has set to help the coating attain its final hardness.

A solvent in which both the silane and water are miscible can be used to aid in acid catalyzed hydrolysis. Use of a solvent is desirable because it allows faster reaction to occur where the silane and water are miscible in the solvent and it permits control over the reaction mixture to permit easy application to the surface. Preferably a volatile solvent is used so quick drying of a coating formed from the reaction mixture occurs. Exemplary of solvents which can be used are oxygenated solvents such as acetone, isopropanol, pentanone, glycols, esters, ethers, and the like.

It is desirable that a coating containing the binders of this invention dry to touch in less than about an hour and substantially completely cure overnight (i.e. in less than about 18 hours). Dry times longer than about an hour are unsatisfactory because the surface coated cannot be handled for subsequent processing steps until the coating has dried set. In addition, a wet coating is easily contaminated with dust particles. Preferably the coating takes longer than about ½ an hour to dry because if the coating dries too fast, an uneven surface results, especially in overlap areas. A preferred solvent which allows drying to occur in the ½ to 1 hour range is ethylene glycol monoethyl ether.

The amount of solvent provided is a balance between the competing considerations of providing a product with sufficiently low viscosity that it can easily be applied to surfaces and at the same time provide a product with high solids content so that a thick film can be quickly provided. Preferably the reactants are combined with from about 5 to about 20, and more preferably from about 8 to about 12 percent by weight of the solvent based on the weight of the silane to provide easy handling and quick buildup of coating thickness.

Coating compositions of this invention comprise not only a binder as described above, but also comprise fillers. Conventional fillers can be used in the coatings. These include silica powder, talc (magnesium silicate), china clay (aluminim silicate), Wollastonite (calcium silicate), barytes (barium sulfate, barium metaborate, and the like. Pigments such as iron oxide, titanium dioxide, and chrome green may also be used. Pigments containing lead should be avoided because of interference with cure. Organic pigments such as hansa yellow, phthalo green, and phthalo blue may also be used to color the product. Zinc oxide can be used to aid film hardening. Barium metaborate is a preferred filler when resistance to sulfur dioxide is desired because it has been found that coating compositions containing barium metaborate exhibit improved resistance to attack by sulfur dioxide. It is believed that this may be due to barium reacting with sulfurous acid, which is formed by dissolution of sulfur dioxide in water, to be converted to a more insoluble barium sulfite which then acts as a temporary barrier for underlying metallic surfaces.

When a coating exhibiting resistance to high temperatures is desired, a finely divided, particulate pigment or filler can be used. Exemplary of such fillers providing high heat resistance are barytes (barium sulfate), mica, micaceous iron oxide, aluminum flake, glass flake, stainless steel flake, and the like. By proper selection of the binder and filler, heat stable coatings resistant to temperatures exceeding 1000° F. can be achieved.

As the ratio of binder to filler in a coating composition increases, the coating's strength increases, but its adhesion to surfaces decreases. The coating comprises preferably at least about 5% by weight of the binder so the coating has sufficient strength and resistance to attack by chemicals, solvents, heat, and weathering to protect the underlying surface, and preferably less than about 85% by weight of the binder so the coating has adequate adhesion to prevent sloughing off in use.

The binder to filler ratio in the coating depends upon the density of the filler. For example, with a light filler such as china clay or titanium dioxide, the coating preferably contains from about 10 to about 85% binder. For a dense filler such as barium sulfate, the coating contains from only about 5% up to about 50% binder.

The silane can be partially hydrolyzed either before or after the polyol and/or silicone is added. Ability to prepare a strong durable coating depends upon the degree of hydrolysis of the silane. Generally, as the degree of hydrolysis of the silane used in a system to prepare a coating increases, adhesion of the coating to the material to be protected worsens, cure time of the coating shortens, shelf-life of the system shortens, and viscosity of the reaction mixture containing the silane increases. In preparing a system, all these factors are balanced in choosing the degree of hydrolysis of the trialkoxysilane. It is generally preferred that the silane be hydrolyzed to at least about 50%, and more preferably from about 70 to 90%, to obtain a coating system which has good adhesion to most marine surfaces, dries to touch in the preferred drying time of from about 178 to about 1 hour, cures overnight, has a shelf-life of at least six months and has sufficiently high thixotrophy that it can be applied to vertical surfaces. The alkoxysilanes must be hydrolyzed before their application to the surface to be coated or else volatile components of the coating system such as the solvent evaporate before cure is properly effected.

Degree of hydrolysis of the precursor is determined by the ratio of the number of moles of water used to hydrolyze the silane to the number of moles of water required for complete hydrolysis. Complete hydrolysis of the silane requires 1. 5 moles of water per mole of silane.

The suitability of a system for forming coatings also depends upon the solvent used and the amount of solvent present. Generally, increasing the amount of solvent present lengthens cure time, lengthens shelf-life, and decreases the viscosity of the reactant/solvent mixture.

Coating compositions prepared containing the binder of this invention can be applied to a surface to be treated by conventional techniques such as spraying or brushing. Curing occurs by absorption of atmospheric moisture at ambient temperatures and even subfreezing temperatures due to the antifreeze effect of polyols, particularly diethylene glycol. However, if desired, the applied coating can be heated and/or exposed to a source of moisture for quick curing. The coatings can be applied to new construction and over inorganic primers such as inorganic coatings containing anticorrosion pigments such as metallic zinc.

The components of a coating of this invention can be supplied in a one-package system. The package contains a solvent, aqueous acid solution, filler, trialkoxysilane, polyol and/or silicones. However, if the filler deleteriously reacts with the acid solution such as when the filler includes zinc oxide, then a two-package system is required where the filler is contained in the second package.

The mixture of the reactants used for preparing the binders of this invention should be provided in a moisture-proof type container so that hydrolysis and condensation do not occur prematurely.

Coatings containing binders of this invention are applied in films of from about 3 to about 10 mils or up, to about 25 mils in thickness. Generally the thicker the coating the more resistant it is to attack by chemical, solvent, heat and weather. If necessary, multiple layers can be applied to the surface to be protected. The preferred dry film thickness is from about 3 to about 5 mils for a quick drying and fast curing film provide good protection to the underlying surface.

These and other features of the present invention will become better understood with reference to the following examples.

EXAMPLES 1-5 (HYDROLYSIS OF METHYL TRIETHOXYSILANE)

Methyl triethoxysilane was hydrolyzed by charging 178 pbw (parts by weight) silane and 20 pbw isopropyl alcohol into a 400 ml. flask. The mixture was agitated with a magnetic stirrer while gradually adding in 10% by weight sulfuric acid solution. The amount of sulfuric acid solution added and the theoretical percent hydrolysis are presented in Table I for each of Examples 1-5. Because the reaction was exothermic, the acid was added at a sufficiently slow rate to prevent excessive heat buildup. The hydrolyzed products were water-clear liquid.

The products were stored at ambient temperature to determine their storage stability. The hydrolyzed silanes of Examples 1-3 were stable in excess of one year. The hydrolyzed silane of Example 4 became a thick gel after one month, and the hydrolyzed silane of Example 5 gelled after approximately one week.

The hydrolyzed silanes of Examples 1-5 were spread on glass plates to evaluate their film forming properties. They all dried and formed films rapidly at ambient temperature. However, after 24 hours of drying, they developed severe film cracking and loss of adhesion to glass with flaking occurring.

TABLE I

| Example | 1 | 2 | 3 | 4 | 5 |
|---|---|---|---|---|---|
| Methyl triethoxysilane (pbw) | 178 | 178 | 178 | 178 | 178 |
| Isopropyl alcohol (pbw) | 20 | 20 | 20 | 20 | 20 |
| 10% by weight $H_2SO_4$ aqueous solution (pbw) | 13.2 | 16.2 | 21.6 | 24.3 | 27.0 |
| Theoretical % hydrolysis | 50% | 60% | 80% | 90% | 100% |

EXAMPLE 6 (BINDER)

A binder according to this invention was prepared from the hydrolyzed silane of Example 3 and a polyol in the proportions shown in Table II. The polyol was added to the hydrolyzed silane while the latter was moderately agitated. The binder of Example 6 formed at ambient temperature a clear film on a glass plate which did not flake off after drying. No film cracking was noticed even at film thicknesses of 5 mils.

EXAMPLE 7 (PIGMENTED COATING)

A coating having the formula presented in Table II was prepared by dispersing with a mechanical stirrer Foam A Barytes and titanium dioxide pigment into a liquid mixture of hydrolyzed silane and polyol. The finished product can be sprayed or brushed onto a glass plate or over an inorganic zinc primer to form at ambient temperature a continuous coating having a moderate degree of gloss after drying. The cured coating has good resistance to fresh and salt water, general petroleum solvents and some ketones and alcohols.

Other glycols and polyols can be used as a partial or total substitute for the polypropylene glycol used for this example. Exemplary of these glycols and polyols are ethylene glycol, polyethylene glycol, propylene glycol, butanediol, trihydroxyhexane, and the like.

EXAMPLE 8 (AIR-DRYING, HEAT-RESISTANT COATING)

A coating having the formula presented in Table II was prepared. The hydrolysis of the silane in the binder was carried out using the same procedure used for Examples 1-5. Silicone was added to the silane immediately after the addition of the phosphoric acid solution. The silicone could have been added before the addition of the phosphoric acid solution with the same results. The barytes were dispersed with a mechanical stirrer. The resultant product was aged for one week at ambient temperature before application in order to obtain optimum curing properties. Alternatively, the product could be aged for 8 hours at 120°-150° F. The cured coating of this Example resists hydrocarbon solvents and remains stable indefinitely when exposed to heat of 600° F.

EXAMPLES 9 and 10 (HEAT RESISTANT COATING — FLAT FINISH)

Heat resistant coatings with a flat finish were prepared using constituents as shown in Table II. The silica powder, barium metaborate and zinc oxide were preblended in a Waring blender for 5 minutes before adding the fillers to the binder. The mixture of the binder and filler can be brushed or sprayed at ambient temperature onto a concrete surface or onto a surface having a protective coating of inorganic zinc primer to form a flat coating which resists heat (600° F.), hydrocarbon solvents, and corrosive gases such as sulfur dioxide.

EXAMPLES 11–12 (HIGH PERFORMANCE COATINGS WITH LOW GLOSS FOR INDUSTRIAL MAINTENANCE)

Coatings of the formulas shown in FIG. 4 were prepared using the method of Examples 9–10. The coatings provide an air-drying, low gloss topcoat which is most suitable for industrial maintenance application because the topcoat has excellent resistance to weather, water, hydrocarbon solvents, and sulfur dioxide gas.

EXAMPLES 13–15 (COATING COMPOSITIONS)

Coating compositions having the formula shown in Table II were prepared by adding the silicone and/or the polyol to the hydrolyzed silane in a beaker, and then blending in the barium sulfate filler. As described below, these coating formulations were used to demonstrate the advantages of coatings of this invention.

water and stack gas containing sulfur dioxide and carbon dioxide.

EXAMPLES 17–26 (COATING SYSTEMS)

These Examples demonstrate the effectiveness of coating systems using a coating according to this invention. The composition of the coating systems for Examples 17–26 is presented in Table III. For each Example, a 2.5 mil thick inorganic zinc primer coating was applied to a sandblasted steel plate. After the primer dried, a midcoat was applied to each plate except the plate for Example 23. The formulations of the midcoats for Examples 7–25 are presented in Table IV. The coating composition of Example 10 was used as the midcoat for Example 26. A topcoat of 4 mils thickness was applied on top of the midcoat for Examples 17–22 and 26. The coating composition of Example 13 was used for Examples 17 and 20, the coating composition of Example 14 was used for Examples 18 and 21, the coating composition of Example 15 was used for Examples 19 and 22, and the coating composition of Example 12 was used for Example 26. The primer, midcoat, and topcoat were all applied by spraying at ambient temperature and all coats exhibited good application properties, including

TABLE II

| Example | Composition (PBW) | | | | | | | | | |
|---|---|---|---|---|---|---|---|---|---|---|
|  | 6 | 7 | 8 | 9 | 10 | 11 | 12 | 13 | 14 | 15 |
| Binder | | | | | | | | | | |
| Hydrolyzed silane of Example 3 | 95 | 90 | — | — | — | — | — | 75 | 95 | 75 |
| Methyl trimethoxy silane | — | — | 95 | 95 | 95 | 100 | 100 | — | — | — |
| 15% by weight $H_3PO_4$ aqueous solution | — | — | 14 | 14 | 14 | 16 | 16 | — | — | — |
| Polyol 1[1] | 5–10 | 10 | — | — | — | — | — | — | — | — |
| Polyol 2[2] | — | — | — | — | — | — | — | — | — | 5 |
| Silicone 1[3] | — | — | 12 | 12 | 12 | — | — | — | — | — |
| Silicone 2[4] | — | — | — | — | — | 25 | 25 | 25 | — | 20 |
| Solvent | | | | | | | | | | |
| Ethylene glycol monoethyl ether | — | — | 10 | 10 | 10 | 10 | 10 | — | — | 10 |
| Filler | | | | | | | | | | |
| Foam A barytes | — | 150 | 196 | — | 61 | 150 | 184 | 150 | 150 | 150 |
| White $TiO_2$ | — | 10 | 4 | — | — | 5 | — | — | — | — |
| Silica powder (100–325 mesh) | — | — | — | 98 | 109 | — | — | — | — | — |
| Barium metaborate | — | — | — | 20 | — | — | — | — | — | — |
| Zinc oxide | — | — | — | 13 | 22 | — | — | — | — | — |
| China clay | — | — | — | — | — | 20 | 24 | — | — | — |
| Blue Pigment | — | — | — | — | — | — | 4 | — | — | — |

[1] Polyol 1 is a polypropylene glycol having an average hydroxyl number of 490 (mg. KOH/g.) sold by Union Carbide under the trade name NIAX LS-490
[2] Polyol 2 is a polypropylene glycol having an average hydroxyl number of 475 (mg. KOH/g.) sold by Union Carbide under the trade name NIAX LS-475.
[3] Silicon 1 is a hydroxy functional silicone intermediate having a 6% by weight hydroxy content available from General Electric under the trade name SR82.
[4] Silicon 2 is a methoxy functional silicone intermediate typically having a 15% by weight methoxy content and an approximate number average molecular weight of 600 available from General Electric under the trade name SR-191.

EXAMPLE 16 (HIGH PERFORMANCE TANK LINING SYSTEM)

A high performance tank lining system for petroleum tankers is prepared by applying a 4 mils thick primer comprising inorganic zinc in an ethyl silicate binder to the interior surfaces of a ship tank which is presandblasted to remove any rust and dirt. The primer is allowed to dry and cure. Then the heat resistant coating of Example 9 is applied by spraying as a midcoat over the primer. The midcoat is allowed to dry and cure to a hard coating. Initial drying to touch requires about 45 minutes at ambient temperature and complete curing to form a hard coating requires from about 1 to about 4 days. Then the coating composition of Example 11 is spray applied as a topcoat over the midcoat. The film thicknesses for each coat is from 3 to 5 mils. This system withstands attack by petroleum products including crude oil, jet fuel, and solvents. It resists attack by sea good sprayability and long pot-life. The pot-life of the coating of example 10 was greater than two hours and the pot-life of the coating of Example 12 was indefinite. The topcoats and the midcoat of Example 26 dried to touch in about 45 minutes and cured overnite.

The coating systems were then subjected to tests A-D to determine their resistance to sulfur dioxide, sea water, solvents, and heat, respectively. Sulfur dioxide test A was done according to Deutsche Normen Method DIN 50018 with 1% sulfur dioxide by volume. The apparatus was filled with small amounts of water and the temperature was fixed at 40° C. so that condensation continuously took place on the steel plates. The coatings were tested until failure.

Sea water immersion Test B was conducted by immersing the plates in synthetic sea water for a minimum of 3 weeks.

Solvent resistance Test C was conducted by immersing the plates in xylol for 3 weeks.

Heat resistance Test D was conducted by placing a test plate on a 500° F. surface for 10 minutes.

The results of these tests are presented in Table III. Compared to the coating systems of Examples 23–25, which did not have a topcoat according to the present invention, the coating systems of Examples 17–22 and 26 showed better resistance to attack by sulfur dioxide. It is estimated that one week's resistance to sulfur dioxide in the sulfur dioxide test is equivalent to one year in actual service. Therefore a coating composition of this invention can be expected to exhibit resistance to attack by sulfur dioxide for several years. The system of Example 26 using both a midcoat and a topcoat according to the present invention had the best resistance to attack by sulfur dioxide.

In addition, the top coats were unaffected by heat and, except for the coating composition of Example 13, were unaffected by xylol solvent.

Thus the coating compositions of this invention protect surfaces from attack by chemicals, solvents, salt water, and heat, and can be applied economically at ambient temperatures without heat cure.

TABLE III

| Example | 17 | 18 | 19 | 20 | 21 | 22 | 23 | 24 | 25 | 26 |
|---|---|---|---|---|---|---|---|---|---|---|
| Primer | A[1] | A | A | A | A | A | A | B[2] | C[3] | A |
| Midcoat | D | D | D | E | E | E | — | F | F | 10 |
| Topcoat | Ex. 13 | Ex. 14 | Ex. 15 | Ex. 13 | Ex. 14 | Ex. 15 | — | — | — | 12 |
| Test A (SO$_2$) | 6–7 wks. | 5 wks. | 6 wks. | 6 wks. | 5 wks. | 6 wks. | 1 wk. | 3 wks. | 3 wks. | 10 wks. |
| Test B (Seawater) | Unaffected | Unaffected | Unaffected | Unaffected | Unaffected | Unaffected | Unaffected | Unaffected | Unaffected | Unaffected |
| Test C (Xylol Solvent) | Slightly soft | Unaffected | Unaffected | Slightly soft | Unaffected | Unaffected | Unaffected | Unaffected | Unaffected | Unaffected |
| Test D (Heat) | Unaffected | Unaffected | Unaffected | Unaffected | Unaffected | Unaffected | Unaffected | Unaffected | Unaffected | Unaffected |
| APPLICATION PROPERTIES | Good | Good | Good | Good | Good | Good | Good | Good | Good | Good |

[1] A is a self curing inorganic zinc primer base on ethyl silicate binder.
[2] B is a post-curing inorganic zinc primer based on sodium silicate binder.
[3] C is a self-curing inorganic zinc primer based on potassium silicate binder.

TABLE IV

| MIDCOAT COMPOSITION (pbw) | | | |
|---|---|---|---|
| Midcoat | D | E | F |
| Ethyl silicate 40* (90% hydrolyzed) | 45 | — | — |
| Ethoxy ethyl silicate (80% hydrolyzed) | — | 36 | — |
| Sodium Silicate Solution (Na$_2$O:SiO$_2$ = 1:3.22) | — | — | 36 |
| Silica Powder (−325 mesh) | 40 | 36 | 36 |
| Barium Sulfate | 10 | — | — |
| Barium Metaborate | — | 36 | 21 |
| Titanium Dioxide | 5 | — | — |
| Zinc Oxide | — | 7 | 7 |

*"Ethyl Silicate 40" is the tradename for an ethyl polysilicate available from Union Carbide Chemical Company having an SiO$_2$ content of about 40% and comprising polysilicates having an average of 5 silicon atoms per molecule.

We claim:

1. A binder for chemically resistant coatings, wherein the major portion of the binder is prepared by reacting in the presence of an aqueous acidic solution (i) trialkoxysilanes having the formula

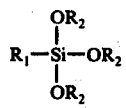

where $R_1$ is selected from the group consisting of alkyl, aryl and cycloalkyl groups containing up to about 6 carbon atoms and where each $R_2$ is independently selected from the group consisting of alkyl, hydroxyalkyl, alkoxyalkyl and hydroxyalkoxyalkyl groups containing up to about 6 carbon atoms, and (ii) aliphatic polyols containing an average of at least two carbon bonded hydroxy groups per polyol and having an average molecular weight of at least 62, wherein the weight ratio of silanes to polyols is from about 5:1 to about 20:1.

2. A binder as claimed in claim 1 in which $R_1$ is an alkyl group.

3. A binder as claimed in claim 2 in which $R_1$ is selected from the group consisting of the methyl and ethyl groups.

4. A binder as claimed in claim 1 in which the $R_2$'s are the same and are selected from the group consisting of the methyl and ethyl groups.

5. A coating composition comprising from about 5 to about 85% by weight of the binder defined in claim 1 and filler.

6. A coating as claimed in claim 5 in which the filler comprises zinc oxide.

7. A coating as claimed in claim 5 in which the filler comprises barium metaborate.

8. A method for protecting a surface against chemical attack comprising treating said surface with a coating composition comprising as a binder the binder defined in claim 1.

9. A method for preparing a binder for a chemically resistant coating comprising the step of reacting in the presence of an aqueous acidic solution (i) trialkoxysilanes having the formula

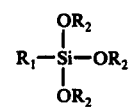

where $R_1$ is selected from the group consisting of aryl, alkyl and cycloalkyl groups containing up to about 6 carbon atoms and where each $R_2$ is independently selected from the group consisitng of alkyl, hydroxyalkyl, alkoxyalkyl and hydroxyalkoxyalkyl groups containing up to about 6 carbon atoms, and (ii) silicone intermediates of the formula

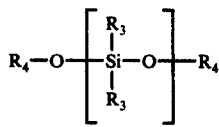

10. A method as claimed in claim 9 in which $R_1$ is an alkyl group.

11. A method as claimed in claim 10 in which $R_1$ is selected from the group consisting of the methyl and ethyl groups.

12. A method as claimed in claim 9 in which the $R_2$'s are the same and are selected from the group consisting of the methyl and ethyl groups.

13. A method as claimed in claim 9 in which each $R_3$ is independently selected from the group consisting of alkyl an aryl groups having up to about 6 carbon atoms and the methoxy an ethoxy groups.

14. A method as claimed in claim 9 including the step of partially hydrolyzing the tiralkoxysilanes before the step of reacting.

15. A method as claimed in claim 14 in which the trialkoxysilanes are from about 70 to about 90% hydrolyzed.

16. The method of claim 9 in which the reaction occurs at ambient temperature.

17. A binder for chemically resistant coatings, wherein the major portion of the binder is prepared by reacting in the presence of an acidic solution (i) trialkoxysilanes having the formula

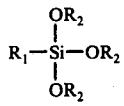

where $R_1$ is selected from the group consisting of alkyl, aryl and cycloalkyl groups containing up to about 6 carbon atoms and where each $R_2$ is independently selected from the group consisting of alkyl, hydroxylakyl, alkoxyalkyl and hydroxyalkoxyalkyl groups containing up to about 6 carbon atoms, (ii) aliphatic polyols containing an average of at least two carbon bonded hydroxy groups per polyol and having an average molecular weight of at least 62, wherein the weight ratio of silanes to polyols is greater than about 5:1, and (iii) silicone intermediates of the formula

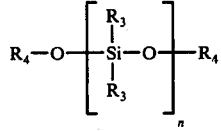

where each $R_3$ is independently selected from the group consisting of the hydroxy group and alkyl, aryl, and alkoxy groups having up to about 6 carbon atoms, where each $R_4$ is independently selected from the group consisting of hydrogen and alkyl an aryl groups having up to about 6 carbon atoms, and where $n$ is selected so that the average molecular weight of the silicone intermediates is from about 500 to 2000, and wherein the weight ratio of silanes to silicone intermediates is greater than about 1:1, and where the weight ratio of silanes to polyols and silicone intermediates in combination is less than 20:1.

18. A binder as claimed in claim 17 in which $R_1$ is an alkyl group.

19. A binder as claimed in claim 18 in which $R_1$ is selected from the group consisting of the methyl and ethyl groups.

20. A binder as claimed in claim 17 in which the $R_2$'s are the same and are selected from the group consisting of the methyl and ethyl groups.

21. A coating composition comprising from about 5 to about 85% by weight of the binder defined in claim 17 and filler.

22. A coating as claimed in claim 21 in which the filler comprises zinc oxide.

23. A coating as claimed in claim 21 in which the filler comprises barium metaborate.

24. A binder as claimed in claim 17 in which each $R_3$ is independently selected from the group consisting of alkyl an aryl groups having up to about 6 carbon atoms and the methoxy and ethoxy groups.

25. A method for protecting a surface against chemical attack comprising treating said surface with a coating composition containing as a binder the binder defined in claim 17.

26. A method for protecting a surface against chemical attack comprising the steps of partially hydrolyzing trialkoxysilanes having the formula

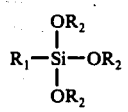

where $R_1$ is selected from the group consisting of alkyl, aryl and cycloalkyl groups containing up to about 6 carbon atoms and where each $R_2$ is independently selected from the group consisting of alkyl, hydroxyalkyl, alkoxyalkyl and hydroxyalkoxyalkyl groups containing up to about 6 carbon atoms and applying to the surface a coating composition comprising (i) aqueous solution, (ii) the partially hydrolyzed trialkoxysilanes, and (iii) aliphatic polyols containing an average of at least two carbon bonded hydroxy groups per polyol and having an average molecular weight of at least 62, wherein the weight ratio of silanes to polyols in the coating is from about 5:1 to about 20:1, wherein the partially hydrolyzed trialkoxysilanes and the polyolys react in the presence of the aqueous acidic solution to form a binder on the surface.

27. A method as claimed in claim 26 in which the binder is formed at ambient temperature.

28. A method as claimed in claim 26 in which the trialkoxysilanes are from about 70 to about 90% hydrolyzed.

29. A method for protecting a surface against chemical attack comprising the steps of partially hydrolyzing trialkoxysilanes having the formula

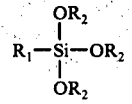

where $R_1$ is selected from the group consisting of aryl, alkyl and cycloalkyl groups containing up to about 6 carbon atoms and where each $R_2$ is independently selected from the group consisting of alkyl, hydroxyalkyl, alkoxyalkyl and hydroxyalkoxyalkyl groups containing up to about 6 carbon atoms, and applying to the surface a coating composition comprising (i) aqueous acidic solution, (ii) the partially hydrolyzed trialkoxysilanes, and (iii) silicone intermediates of the formula

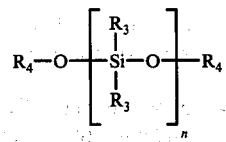

where each $R_3$ is independently selected from the group consisting of the hydroxy group and alkyl, aryl, and alkoxy groups having up to about 6 carbon atoms, where each $R_4$ is independently selected from the group consisting of hydrogen and alkyl and aryl groups having up to about 6 carbon atoms, and where $n$ is selected so that the average molecular weight of the silicone intermediates is from about 500 to about 2000, and wherein the weight ratio of silanes to silicone intermediates in the coating is from about 1:1 to about 9:1, wherein the partially hydrolyzed trialkoxysilanes and the silicone intermediates react in the presence of the aqueous acidic solution to form a binder on the surface.

30. A method as claimed in claim 29 in which the binder is formed at ambient temperature.

31. The method of claim 30 in which the reaction occurs at ambient temperature.

32. A method as claimed in claim 29 in which the trialkoxysilanes are from about 70 to about 90% hydrolyzed.

33. A method for protecting a surface against chemical attack comprising the steps of partially hydrolyzing trialkoxysilanes having the formula

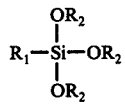

where $R_1$ is selected from the group consisting of alkyl, aryl and cycloalkyl groups containing up to about 6 carbon atoms and where each $R_2$ is independently selected from the group consisting of alkyl, hydroxyalkyl, alkoxyalkyl and hydroxyalkoxyalkyl groups containing up to about 6 carbon atoms, and applying a coating composition comprising (i) aqueous acidic solution, (ii) the partially hydrolyzed trialkoxysilanes, (iii) aliphatic polyols containing an average of at least two carbon bonded hydroxy groups per polyol and having an average molecular weight of at least 62, wherein the weight ratio of silanes to polyols is greater than about 5:1 and (iv) silicone intermediates of the formula

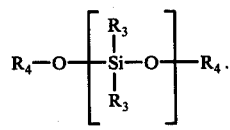

where each $R_3$ is independently selected from the group consisting of the hydroxy group and alkyl, aryl, and alkoxy groups having up to about 6 carbon atoms, where each $R_4$ is independently selected from the group consisting of hydrogen and alkyl and aryl groups having up to about 6 carbon atoms, and where $n$ is selected so that the average molecular weight of the silicone intermediates is from about 500 to 2000, and wherein the weight ratio of silanes to silicone intermediates is greater than about 1:1, and where the weight ratio of silanes to polyols and silicone intermediates in combination is less than 20:1, wherein the partially hydrolyzed trialkoxysilanes, the polyols, and the silicone intermediates react in the presence of the aqueous acidic solution to form a binder on the surface.

34. A method as claimed in claim 33 in which the binder cures at ambient temperature.

35. A method as claimed in claim 33 in which the trialkoxysilanes are from about 70 to about 90% hydrolyzed.

36. A method for preparing a binder for a chemically resistant coating comprising the step of reacting in the presence of an aqueous acidic solution (i) trialkoxysilanes having the formula

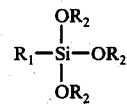

where $R_1$ is selected from the group consisting of alkyl, aryl and cycloalkyl groups containing up to about 6 carbon atoms and where each $R_2$ is independently selected from the group consisting of alkyl, hydroxyalkyl, alkoxyalkyl, and hydroxyalkoxyalkyl groups containing up to about 6 carbon atoms, and (ii) aliphatic polyols containing an average of at least two carbon bonded hydroxy groups per polyol and having an average molecular weight of at least 62, wherein the weight ratio of trialkoxysilanes to polyols is from about 5:1 to about 20:1.

37. A method as claimed in claim 36 in which $R_1$ is an alkyl group.

38. A method as claimed in claim 37 in which $R_1$ is selected from the group consisting of the methyl and ethyl groups.

39. A method as claimed in claim 36 in which the $R_2$'s are the same and are selected from the group consisting of the methyl and ethyl groups.

40. A method as claimed in claim 36 including the step of partially hydrolyzing the trialkoxysilanes before the step of reacting.

41. A method as claimed in claim 40 in which the trialkoxysilanes are from about 70 to about 90% hydrolyzed.

42. A method for preparing a binder for a chemically resistant coating comprising the step of reacting in the presence of an aqueous acidic solution (i) trialkoxysilanes having the formula

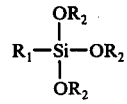

where $R_1$ is selected from the group consisting of alkyl, aryl and cycloalkyl groups containing up to about 6 carbon atoms and where each $R_2$ is independently selected from the group consisting of alkyl, hydroxyalkyl, alkoxyalkyl and hydroxyalkoxyalkyl groups containing up to about 6 carbon atoms, (ii) aliphatic polyols containing an average of at least two carbon bonded hydroxy groups per polyol and having an average molecular weight of at least 62, wherein the weight ratio of silanes to polyols is greater than about 5:1, and (iii) silicone intermediates of the formula

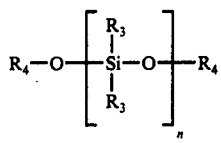

where each $R_3$ is independently selected from the group consisting of the hydroxy group and alkyl, aryl, and alkoxy groups having up to 6 carbon atoms, where each $R_4$ is independently selected from the group consisting of hydrogen and alkyl and aryl groups having up to about 6 carbon atoms, and where $n$ is selected so that the average molecular weight of the silicone intermediates is from about 500 to about 2000, and wherein the weight ratio of silanes to silicone intermediates is greater than about 1:1, and where the weight ratio of silanes to polyols and silicone intermediates in combination is less than about 20:1.

43. A method as claimed in claim 42 in which $R_1$ is an alkyl group.

44. A method as claimed in claim 43 in which $R_1$ is selected from the group consisting of the methyl and ethyl groups.

45. A method as claimed in claim 42 in which the $R_2$'s are the same and are selected from the group consisting of the methyl and ethyl groups.

46. A method as claimed in claim 42 in which each $R_3$ is independently selected from the group consisting of alkyl and aryl groups having up to about 6 carbon atoms and the methoxy and ethoxy groups.

47. A method as calimed claim 42 including the step of partially hydrolyzing the trialkoxysilanes before the step of reacting.

48. A method as claimed in claim 47 in which the trialkoxysilanes are from about 70 to about 90% hydrolyzed.

49. The method of claim 42 in which the reaction occurs at ambient temperature.

* * * * *

UNITED STATES PATENT AND TRADEMARK OFFICE
CERTIFICATE OF CORRECTION

PATENT NO. : 4,113,665                    Page 1 of 2
DATED     : September 12, 1978
INVENTOR(S) : GABRIEL H. LAW and ALBERT PETER GYSEGEM It is certified that error appears in the above-identified patent and that said Letters Patent are hereby corrected as shown below:

Abstract, line 2, "najor" should read --major--; line 3, "resence" should read --presence--; line 4, "liphatic" should read --aliphatic--; line 5, "ilanes" should read --silanes. Column 1, line 16, after "chloride" insert a comma. Column 2, line 24, "hydroxyalkoxylalkyl" should read --hydroxyalkoxyalkyl- Column 5, line 62, after "increases" insert a comma. Column 7, line 68, after "12" insert a comma. Column 8, line 7, "aluminim" should read --aluminum--; line 8, between "metaborate" and the comma insert --)--; line 63, "178" should read --1/2--. Column 11, lines 45 and 47 (Table II, lines 26 and 28), "Silicon" should read --Silicone--. Column 14, line 66 (claim 9, line 24), after the formula insert --where each $R_3$ is independently selected from the group consisting of the hydroxy group and alkyl, aryl, and alkoxy groups having up to about 6 carbon atoms, where each $R_4$ is independently selected from the group consisting of hydrogen and alkyl and aryl groups having up to about 6 carbon atoms, and where n is selected so that the average molecular weight of the silicone intermediates is from about 500 to about 2000, and wherein the weight ratio of silanes to silicone intermediates is from about 1:1 to about 9:1.--. Column 15, line 10 (claim 13, line 4), "an" should read --and--; line 12 (claim 14, line 2, "tiralkoxysilanes" should read --trialkoxysilanes--; line 53 (claim 17, line 34), "an" should read --and--; line 56 (claim 17, line 37), after "to" insert --about- Column 16, line 10 (claim 24, line 3), "an" should read --and--. Column 17, line 65 (claim 33, line 37), after "to" insert --about--. Column 19, line 11 (claim 42, line 32), after "to" insert --about--.

UNITED STATES PATENT AND TRADEMARK OFFICE
CERTIFICATE OF CORRECTION

PATENT NO. : 4,113,665

DATED : September 12, 1978

INVENTOR(S) : GABRIEL H. LAW and ALBERT PETER GYSEGEM

It is certified that error appears in the above-identified patent and that said Letters Patent are hereby corrected as shown below:

Col. 20, line 13 (claim 47, line 1), "calimed" should read --claimed in--.

Signed and Sealed this

Twenty-seventh Day of March 1979

[SEAL]

Attest:

RUTH C. MASON
Attesting Officer

DONALD W. BANNER
Commissioner of Patents and Trademarks